United States Patent [19]

Kyong-keun

[11] Patent Number: 5,224,027
[45] Date of Patent: Jun. 29, 1993

[54] POWER SUPPLY APPARATUS FOR MAGNETRON DRIVING

[75] Inventor: Lee Kyong-keun, Suwon, Rep. of Korea

[73] Assignee: Samsung Electronics Co., Ltd., Suweon, Rep. of Korea

[21] Appl. No.: 883,482

[22] Filed: May 15, 1992

[30] Foreign Application Priority Data

May 16, 1991 [KR] Rep. of Korea ............. 91-7984

[51] Int. Cl.$^5$ .................. H02M 3/335; H05B 6/80
[52] U.S. Cl. .................. 363/21; 219/10.55 B
[58] Field of Search ............ 363/16, 20, 21, 97; 219/10.55 B, 10.55 R

[56] References Cited

U.S. PATENT DOCUMENTS

| 4,886,951 | 12/1989 | Matsumoto et al. | 219/10.55 B |
| 4,903,183 | 2/1990 | Noguchi et al. | 363/21 |
| 5,003,141 | 3/1991 | Braunisch et al. | 219/10.55 B |
| 5,082,998 | 1/1992 | Yoshioka | 219/10.55 B |

FOREIGN PATENT DOCUMENTS

| 53-27143 | 3/1978 | Japan. | |
| 0078183 | 3/1990 | Japan | 219/10.55 B |
| 2-135690 | 5/1990 | Japan. | |

Primary Examiner—Emanuel T. Voeltz
Attorney, Agent, or Firm—Burns, Doane, Swecker & Mathis

[57] ABSTRACT

In a power supply apparatus for magnetron driving, as abrupt current change occurs under loaded power supplies of 3.7 K V.–4.1 K V, the power supply detects the currents of 3.7 K V–4.1 K V and protects the magnetron from the overcurrents by controlling output voltages through feeding back the voltages according to currents and by outputting stable power supplies.

9 Claims, 2 Drawing Sheets

POWER SUPPLY APPARATUS FOR MAGNETRON DRIVING

BACKGROUND OF THE INVENTION

1. Field of the Invention

The present invention relates to a power supply apparatus for magnetron driving in a micro-wave oven, and more particularly to a power supply apparatus for driving a magnetron in the micro-wave oven wherein damages wrought on magnetrons by the overcurrent can be prevented by applying stable currents to a power supply apparatus for driving a magnetron which employs S.M.P.S. (Switching Mode Power supply) system.

2. Description of the Prior Art

Generally, high voltages are needed to drive a magnetron of a micro-wave oven and high-voltage transformers or inverters are used for generating high voltages.

A power supply apparatus for magnetron driving employing an inverter is described in Japanese laid open patent application NO. 53-27143, entitled "the power supply apparatus for driving magnetron".

According to Japanese laid open patent application NO. 53-27143, the power supply apparatus for driving a magnetron is composed of a frequency oscillation circuit which can change duty cycles of output signals, a high frequency oscillation circuit which controls signal transfer or signal oscillation according to output signals from a frequency oscillation circuit and a switching circuit being switched according to the signals from high frequency oscillation ciruits. Miniaturization lightening and reduced cost of the output transformer can be realized.

However, this kind of inverter-type power supply apparatus for magnetron driving has disadvantages including unstable output voltages against the load and voltage changes which causes damage to the magnetron. Further, when a high voltage transformer is used, the power supply apparatus tends to become bulky and heavy as it generates high voltages.

Accordingly, it is an object of the present invention to provide a power supply apparatus for driving a magnetron which can supply stable electric power to prevent damages on the magnetron by overcurrents, while at the same time providing a miniaturized power supply apparatus as well.

SUMMARY OF THE INVENTION

The present invention relates to a power supply apparatus for magnetron driving in a micro-wave oven which prevent damages to the magnetron resulting from overcurrents by supplying stable power to the magnetron, comprising:

first rectifying means which transforms alternating currents to direct currents;

a transformer which generates sine-wave voltages to the secondary winding through switching once the direct currents of said first 1 rectifying means are inputted;

first feedback means which feeds back voltages generated from said transformer;

second rectifying means which rectifies voltages generated from the transformer and supplies the voltages to the magnetron;

a current detecting transformer which generates voltages according to the currents applied to the magnetron;

second feedback means which feeds back and then divides voltages generated by said current detecting transformer;

a pulse width modulation (PWM) control means which outputs switching control pulses for adjusting voltages according to the feedback voltages of said first and second feedback means;

a switching means which controls the voltages supplied to the magnetron by switching the transformer in accordance with switching control pulses of said PWM control means.

BRIEF DESCRIPTION OF THE DRAWINGS

For better understanding of the nature and objects of the invention, reference should be made to the following detailed description taken in connection with the accompanying drawings in which.

DETAILED DESCRIPTION OF THE INVENTION

Figure 1:
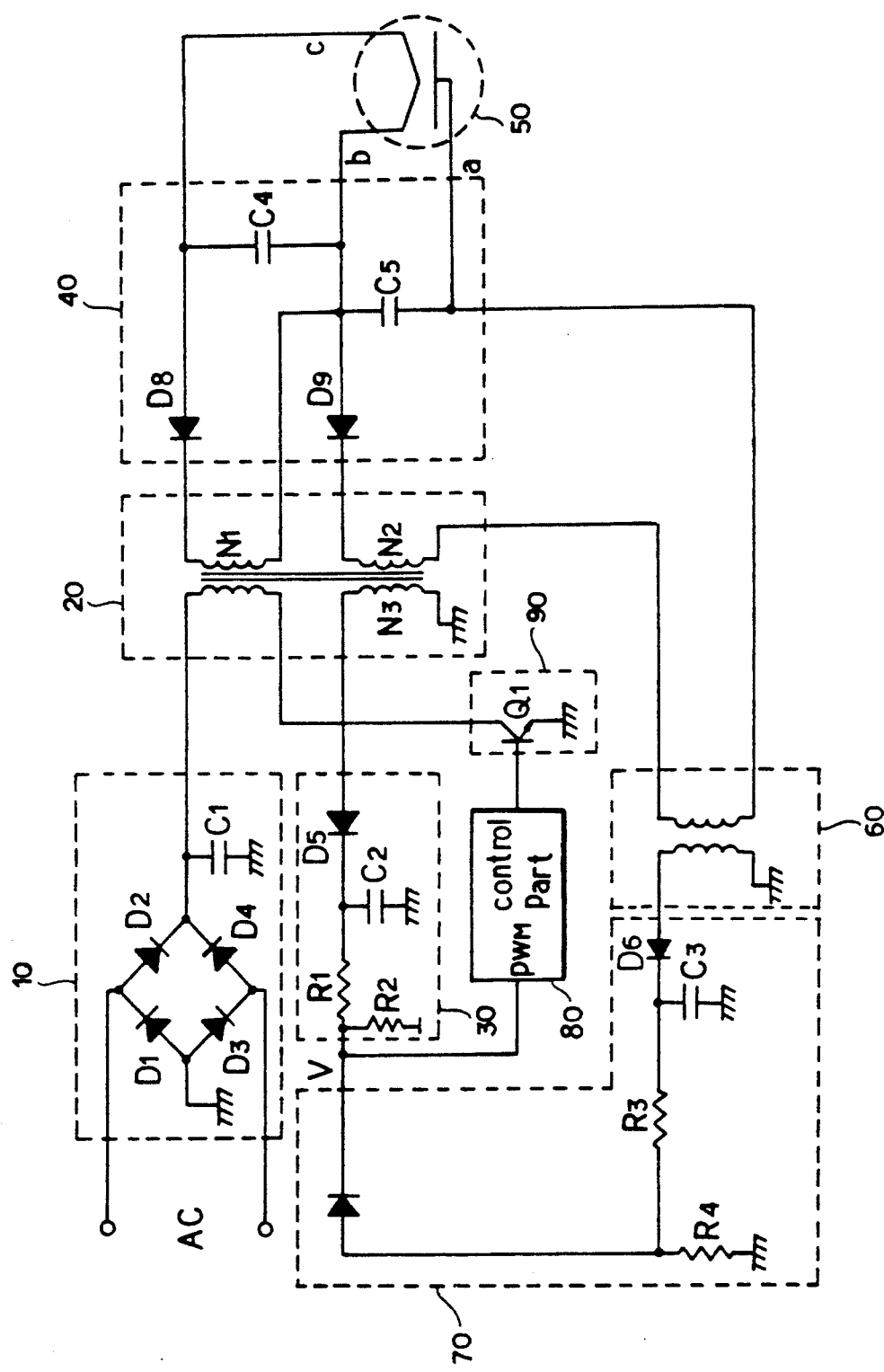
FIG. 1 is a circuit drawing of power supply apparatus for magnetron driving in accordance with the present invention.

FIG. 1 is a circuit drawing of power supply apparatus for magnetron driving according to the present invention, including:

rectifying means 10 which transforms alternating currents to direct currents;

a transformer 20 which generates sine wave voltages to the secondary winding by a switching operation once direct current which is the output of said rectifying means 10 is inputted;

feedback means 30 which feeds back voltages generated from said transformer 20;

rectifying means 40 which rectifies voltages generated from the transformer 20 and supplies the voltages to the magnetron 50;

a current detecting transformer 60 which generates voltages according to the currents applied to the magnetron 50;

Feedback means 70 which feeds back and divides voltages generated by said current detecting transformer 60;

PWM control means 80 which outputs switching control pulses for control of voltages according to the feedback voltages of said feedback means 30, 70;

a switching means 90 which controls voltages applied to the magnetron 50 through the switching operation of the transformer 20 according to the switching control pulses of said PWM control means 80.

The rectifying means 10 is composed of diodes D1–D4 and a capacitor C1, rectifying means 40 is composed of diodes D8 and D9 and capacitors C4, C5. Feedback means 70 includes diodes D6, D7, resistors R3, R4 and a capacitor C3.

More detail regarding a power supply apparatus for magnetron driving in a preferred embodiment according to the present invention can be explained as follows.

In FIG. 1, when alternating currents (AC)are inputted to rectifying means 10, full-wave rectification is effected by bridge-type, rectifying diodes D1–D4.

The currents full-wave rectified at bridge-type rectifying diodes D1–D4 are charged by a capacitor C1 and inputted to a transformer 20. The switching pulses of PWM control means 80 in conjunction with the switching means 90 perform switching operations, causing voltages to be excited to coils N1–N3.

The voltages excited by the coils N1, N2 of transformer 20 are half-wave rectified at rectifying means 40 and supplied to the magnetron 50 to drive the magnetron. Thereby, electromagnetic waves are generated at the magnetron 50.

When waves are generated, direct voltages of 3.7–4.1 KV are supplied to terminals a-b of magnetron 50 while heater voltages of 2–3 V are supplied to terminals b-c.

Meanwhile, at PWM control part 80, the feedback value Vf of output voltage, i.e, the voltage excited to the coil N3 of transformer 20, is half-wave rectified at a diode D5 of feedback means 30 and charged in a condenser C2. According to voltages Vf divided by resistors R1, R2, the on-off time of switching means 90 is controlled. The duty ratio of voltages applied to the primary winding of the transformer 20 is controlled, causing output voltages to be stabilized.

Figure 2:
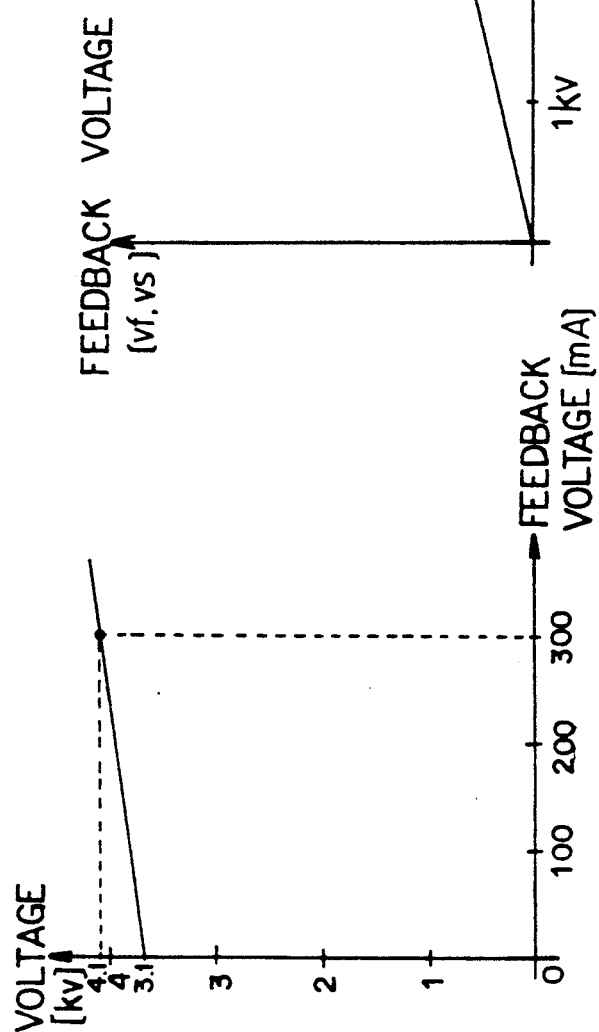
FIG. 2 is a current characteristics diagram for the magnetron voltages as used in the apparatus of FIG. 1.

However, the magnetron M1, as illustrated in FIG. 2, operates under unloading of zero current with the voltage of 3.7 KV and within 3.7 KV –4.1 KV which is the operational range of the magnetron 50, the current drops abruptly to 0 mA–300 mA.

Accordingly, in the process of stabilizing output voltage by way of feedback value Vf, the current changes abruptly (0 Ma–300 mA) within the narrow voltage ranges (3.7 KV–4.1 KV) where the magnetron 50 is operated, causing the output voltage to be unstable.

Consequently, if the voltage generated from the magnetron 50 increases to more than 3.7 KV and if the current applied to the current detecting transformer 60 as the current increases, the voltage generated from the secondary winding of the transformer 60 is half-wave rectified by the diode D6 of feedback means 70 and charged by a capacitor C3. Further, the voltage is divided by resistors R3, R4 and supplied to PWM control part 80 through a diode D7, thereby controlling the pulse width of PWM control part 80, which consequently controls the switching cycle and stabilizes the voltages supplied to the magnetron 50.

Figure 3:
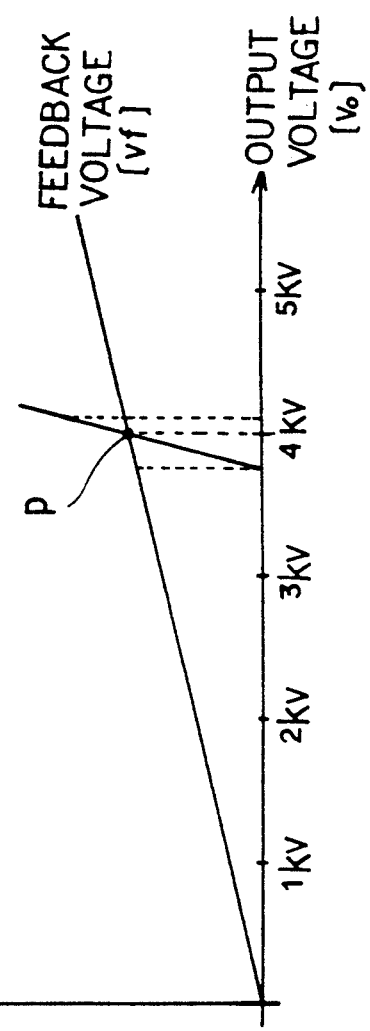
FIG. 3 is a feedback voltage characteristics diagram as used in the apparatus of FIG. 1.

In other words, as seen in the FIG. 3 output voltage characteristic diagram, stabilized voltages are obtained by the feedback voltage Vf excited to a coil N3 of a transformer 20 under the output voltage of less than "P" point while, if the output voltage Vo is increased to over "P" point, the switching cycle is controlled to prevent overcurrent flow by the feedback voltage Vs of the output voltage Vo.

However, if the voltage applied to the magnetron 50 is less then 3.7 KV, the diode D 7 of feedback means 70 is designed to prevent backward current caused by feedback means 30.

Therefore, the power supply apparatus for magnetron driving in accordance with the present invention, as mentioned in the above, supplies the power to the magnetron by way of S M P S system. As a result, magnetron will be protected from the overcurrents and furthermore the weight and magnitude of the power supply apparatus can be reduced.

As explained in the detailed description of the invention, the invention is not restricted to the above examples. In practice many variations are possible to those skilled in the art without departing from the scope of this invention, and more particularly, the current detecting transformer can be conventionally replaced by other current detecting means, which accordingly can provide lots of variations for the feedback means.

What is claimed is:

1. A power supply apparatus for driving a magnetron comprising:
    first rectifying means for transforming alternating current to direct current;
    a transformer for generating a sine-wave voltage to a secondary winding responsive to a switching operation when the direct current is received from said first rectifying means;
    first feedback means for feeding back said voltage generated from said transformer;
    second rectifying means for rectifying said voltage generated by said transformer, and supplying said voltage to the magnetron;
    a current detecting transformer for generating a feedback voltage in accordance with said voltage supplied to the magnetron;
    second feedback means for feeding back said feedback voltage generated by said current detecting transformer;
    pulse width modulation control means for generating switching control pulses for controlling said voltage based on said voltage fed back to said first and second feedback means;
    switching means for controlling the voltage supplied to the magnetron by said switching operation in accordance with switching control pulses of said pulse width modulation control means.

2. The power supply apparatus for magnetron driving of claim 1 wherein said first feedback means receives feedback during unloading.

3. The power supply apparatus of claim 1 wherein said second feedback means receives feedback when said voltage supplied to said magnetron is stable and overcurrents are generated.

4. An apparatus for driving a magnetron, said apparatus comprising:
    means for generating a voltage and supplying said voltage to a magnetron;
    means for generating a feedback voltage based on said voltage;
    means for generating a switching control pulse based on said feedback voltage; and
    means for controlling said voltage based on said switching control pulse.

5. The apparatus of claim 4 wherein said controlling means further includes means for stabilizing said voltage.

6. The apparatus of claim 4, wherein a width of said switching control pulse indicates stability of said voltage.

7. A method for driving a magnetron, said apparatus comprising:
    generating a supply voltage;
    supplying said voltage to a magnetron;
    generating a feedback voltage based on said supply voltage;
    generating a switching control pulse based on said feedback voltage; and
    controlling said voltage based on said switching control pulse.

8. The method of claim 7 wherein said step of controlling includes stabilizing said voltage.

9. The method of claim 7, wherein a width of said switching control pulse indicates stability of said voltage.

* * * * *